United States Patent [19]

Ferriere

[11] Patent Number: 5,880,856
[45] Date of Patent: Mar. 9, 1999

[54] PROGRESSIVE IMAGE TRANSMISSION USING DISCRETE WAVELET TRANSFORMS

[75] Inventor: Philippe Ferriere, Redmond, Wash.

[73] Assignee: Microsoft Corporation, Redmond, Wash.

[21] Appl. No.: 752,643

[22] Filed: Nov. 19, 1996

Related U.S. Application Data

[63] Continuation of Ser. No. 349,324, Dec. 5, 1994, abandoned.

[51] Int. Cl.$^6$ .............................. H04N 1/415; H04N 1/41
[52] U.S. Cl. ........................ 358/432; 358/433; 358/426; 358/434; 382/240; 382/248; 382/233
[58] Field of Search .................................... 358/432, 433, 358/539, 540, 427, 426, 261.3, 261.1, 434; 382/240, 246, 248, 233, 166; 348/403, 408, 420, 398, 24

[56] References Cited

U.S. PATENT DOCUMENTS

| | | | |
|---|---|---|---|
| 4,222,076 | 9/1980 | Knowlton | 358/263 |
| 4,261,018 | 4/1981 | Knowlton | 358/263 |
| 4,414,580 | 11/1983 | Johnsen et al. | 358/261.3 |
| 4,764,805 | 8/1988 | Rabbani et al. | 358/13 |
| 5,101,446 | 3/1992 | Resnikoff et al. | 382/248 |
| 5,272,543 | 12/1993 | Yanagisawa | 358/403 |
| 5,315,670 | 5/1994 | Shapiro | 382/240 |
| 5,321,776 | 6/1994 | Shapiro | 382/240 |
| 5,384,725 | 1/1995 | Coifman et al. | 358/426 |
| 5,412,741 | 5/1995 | Shapiro | 382/232 |
| 5,414,805 | 5/1995 | Cainahan | 358/403 |
| 5,420,636 | 5/1995 | Kojima | 348/403 |
| 5,453,945 | 9/1995 | Tucker et al. | 382/251 |
| 5,467,404 | 11/1995 | Vuylsteke | 382/274 |
| 5,488,674 | 1/1996 | Burt et al. | 382/162 |
| 5,521,717 | 5/1996 | Maeda | 358/426 |
| 5,602,589 | 2/1997 | Vishwanath et al. | 382/240 |
| 5,684,604 | 11/1997 | Nakajima | 358/434 |
| 5,689,562 | 11/1997 | Hassan et al. | 348/24 |
| 5,699,170 | 12/1997 | Yokose | 358/426 |

FOREIGN PATENT DOCUMENTS

| | | |
|---|---|---|
| 91/03902 | of 1990 | European Pat. Off. . |
| 0 555 048 A2 | 2/1993 | European Pat. Off. . |
| 1445281 | of 1973 | United Kingdom . |
| 2163026 | of 1985 | United Kingdom . |

OTHER PUBLICATIONS

Mallat, Stephane G., "A Theory for Multiresolution Signal Decomposition: The Wavelet Representation," *IEEE Transactions on Pattern Analysis and Machine Intelligence*, vol. 11, No. 7, pp. 674–692 (Jul. 1989).

(List continued on next page.)

*Primary Examiner*—Edward L. Coles, Sr.
*Assistant Examiner*—Fan Lee
*Attorney, Agent, or Firm*—Lee & Hayes, PLLC

[57] ABSTRACT

Disclosed herein is a method of storing and of progressively transferring a still image so that it can be conveniently previewed during the transfer and so that a user can terminate the transfer at an early stage if the image turns out to be undesirable. The methods of the invention include transforming the image into a plurality of decomposition levels using a discrete wavelet transform. Each decomposition level comprises a plurality of subimages which allow reconstruction of an image representation of the still image. The decomposition levels are transmitted beginning with a base decomposition level providing a low level of image resolution and then proceeding with decomposition levels providing increasingly higher levels of image resolution. Within each decomposition level, rows of the various subimages are arranged or interlaced together in contiguous blocks, so that all data for a single row, at a single decomposition level, is transmitted together. At the receiving end of the transfer, the row blocks are reconstructed and displayed as they are received. The invention enables the initial display of a low resolution image which is gradually updated and sharpened, on a row-by-row basis, until a desired high resolution is achieved. The user may terminate the transfer at any point.

22 Claims, 10 Drawing Sheets

OTHER PUBLICATIONS

Zettler, William R., et al., "Application of Compactly Supported Wavelets to Image Compression," *Aware Technical Report AD900119*, pp. 1–9 (1991).

Antonini, Marc et al., "Image Coding Using Wavelet Transform," *IEEE Transactions On Image Processing*, vol. 1, No. 2, pp. 205–220 (Apr. 1992).

Shaprio, Jerome M., "An Embedded Hierachical Image Coder Using Zerotrees of Wavelet Coefficients," *IEEE Proceedings of Data Compression conference*, pp. 214–223 (1993).

Blanford, Ronald P., "Wavelet Encoding and Variable Resolution Progressive Transmission," *NASA Space and Earth Science Data Compression Workshop*, pp. 25–35 (1993).

Baaziz, Nadia, et al., "Laplacian Pyramid Versus Wavelet Decomposition for Image Sequence Coding," *IEEE International Conference On Acoustics, Speech and Signal Processing*, pp. 1965–1968, (1990).

Vetterli, Martin et al., "Wavelets and Filter Banks: Relationships and New Results," *IEEE International Conference on Acoustics, Speech and Signal Processing*, pp. 1723–1726, (1990).

Press, William H. "Wavelets Transforms: A Primer", *Center for Astrophysics*, Preprint Series No. 3184, pp. 1–24.

Cody, Mac A., "The Fast Wavelet Transform—Beyond Fourier Transforms," *Dr. Dobbs Journal*, pp. 16–28, 100–101, (Apr. 1992).

Rioul, Olivier, et al., "Wavelets and Signal Processing," *IEEE Signal Processing Magazine*, pp. 14–38, (Oct. 1991).

Mallat, Stephane G., "A Compact Multiresolution Representation: The Wavelet Model," *IEEE Proceedings of Workshop on Computer Vision*, pp. 2–7 (1987).

Mallat, S.G., "Multiresolution Approach To Wavelets In Computer Vison," *Proceedings of the International Conference*, Marseille, France, pp. 313–327 (Dec. 1987).

Daubechies, Ingrid et al., Society for Industrial and Applied Mathematics, "The What, Shy, and How of Wavelets," *Ten Lectures on Wavelets*, Chapter 1, pp. 1–16 (1992).

PROGRESSIVE IMAGE TRANSMISSION USING DISCRETE WAVELET TRANSFORMS

This is a continuation application of U.S. application Ser. No. 08/349,324, which was filed Dec. 5, 1994, now abandoned.

TECHNICAL FIELD

This invention relates to methods and data structures for transferring still images over relatively low-speed communication channels to allow row-by-row viewing of the images at increasing levels of resolution during image transfer.

BACKGROUND OF THE INVENTION

Digitally-formatted still graphic images are popular items among users of public on-line information services. These services allow users to select from large numbers of digitized images, and to download the selected images for viewing on the user's own computer. The availability and widespread use of high-resolution computer displays has increased the demand for high-quality digitized images.

Despite the widespread availability of digitized images for downloading, finding and obtaining useful images can be a frustrating experience. This is due primarily to the large amount of data required to represent a high-resolution computer image and to the corresponding length of time required to download such an image to an individual's personal computer using conventional telecommunication techniques. Although data compression is commonplace, high-resolution images can still take several minutes to transfer.

For instance, a true-color 640 by 480 pixel image, represented by 24 data bits per image pixel, takes at least 12 minutes to transfer using a 9600 baud modem. Common data compression techniques can reduce this time to perhaps one to two minutes. Even this delay, however, can be very frustrating. Compounding the frustration is the very likely possibility that the image, once it is transferred and viewed, will turn out to be something quite different than what the user expected or desired. Downloading and screening a number of images can easily take hours.

Progressive image transmission is a technique used to reduce this frustration to some degree. It allows a receiving computer to quickly display a very low-resolution representation of the image being downloaded. As more and more data is obtained by the user's computer, the image is displayed at ever-increasing levels of resolution. The user can terminate the transfer at any point if the image appears to be unusable.

Discrete wavelet transformation is a recently developed technique which has been used to compress still image data and to also facilitate progressive image transmission. Several authors have described methods for compressing and transmitting still image data using discrete wavelet transformation. See, for example, the following articles, which are hereby incorporated by reference:

A. Mallat, Stephane G., "A Theory for Multiresolution Signal Decomposition: The Wavelet Representation", *IEEE Transactions on Pattern Analysis and Machine Intelligence*, Vol. 11, No. 7, pp. 674–692 (July 1989)

B. Zettler, William R., et al., "Application of Compactly Supported Wavelets to Image Compression",*Aware Technical Report AD900119*, pp. 1–9 (1991)

C. Antonini, Marc, et al., "Image Coding Using Wavelet Transform", *IEEE Transactions On Image Processing*, Vol. 1, No. 2, pp. 205–220 (April 1992)

D. Shapiro, Jerome M., "An Embedded Hierarchical Image Coder Using Zerotrees Of Wavelet Coefficients", *IEEE Proceedings of Data Compression Conference*, pp. 214–223 (1993)

E. Blanford, Ronald P., "Wavelet Encoding and Variable Resolution Progressive Transmission", *NASA Space and Earth Science Data Compression Workshop*, pp. 25–35 (1993)

In addition to the articles cited above, the following articles, also incorporated by reference, give more general descriptions of discrete wavelet transforms:

A. Baaziz, Nadia, et al., "Laplacian Pyramid Versus Wavelet Decomposition for Image Sequence Coding",*IEEE International Conference On Acoustics, Speech and Signal Processing*, pp. 1965–1968, (1990)

B. Vetterli, Martin, et al., "Wavelets and Filter Banks: Relationships and New Results", *IEEE International Conference on Acoustics, Speech and Signal Processing*, pp. 1723–1726, (1990)

C. Press, William H., "Wavelet Transforms: A Primer", *Center for Astrophysics*, Preprint Series No. 3184, pp. 1–24

D. Cody, Mac A., "The Fast Wavelet Transform—Beyond Fourier Transforms", *Dr. Dobb's Journal*, pp. 16–28; 100–101, (April 1992)

E. Rioul, Olivier, et al., "Wavelets and Signal Processing", *IEEE Signal Processing Magazine*, pp. 14–38, (October 1991)

F. Mallat, Stephane G., "A Compact Multiresolution Representation: The Wavelet Model", *IEEE Proceedings of Workshop on Computer Vision*, pp. 2–7, (1987)

G. Mallat, S. G., "Multiresolution Approach To Wavelets In Computer Vision", *Proceedings of the International Conference*, Marseille, France, pp. 313–327 (December, 1987)

H. Daubechies, Ingrid; Vetterling, William T.; Teukolsky, Saul A.; Society for Industrial and Applied Mathematics, "The What, Why, and How of Wavelets", *Ten Lectures on Wavelets, Chapter* 1, pp. 1–16 (1992)

As explained by Zettler et al. at pages 2–4 of their article entitled "Application of Compactly Supported Wavelets to Image Compression," the term wavelet refers to an orthonormal basis for $L^2(R)$, the square-integrable function on the real line, which is defined recursively from a set of scaling function coefficients $$\{a_k\colon k\in\{0,\ldots,2N-1\}, N\in Z^+, a_k\in R\}$$

that satisfies the following conditions $$\Sigma a_k = 2$$

$$\Sigma a_k^2 = 2$$

and more generally, $$\Sigma a_k a_{k+2l} = 2\delta_{0l}$$

As further explained by Zettler et al., there are infinitely many sets $a_k$ for $N\geq 2$ that satisfy these conditions. These coefficients implicitly define a scaling function $\phi(x)$ satisfying the following recursion:

$$\phi(x) = \Sigma a_k \phi(2x-k)\ k\in\{0,\ldots,2N-1\}$$

The scaling functions, their translates, the associated fundamental wavelet function $\Psi(x)$, and scaled translates of $\Psi$ form an orthonormal basis for $L^2(R)$. The wavelet function $\Psi$ is defined in terms of the scaling function as $$\Psi(x) = \Sigma(-1)^{k)i} a_{k+1} \phi(2x+k) \ k \in \{-1, \ldots, 2N-2\}$$

In one dimension, the discrete wavelet transform produces, from an input sequence $X = \{x_i\}$, two output sequences (with $k \in \{0, \ldots, 2N-1\}$):

$$\Phi = \{\phi_i\} = (1/\sqrt{2})\{\Sigma \ a_k x_{2i+k}\}$$

$$\Psi = \{\psi_i\} = (1/\sqrt{2})\{\Sigma \ (-1)^k a_{2N-1-k} x_{2i+k}\}$$

Since the discrete wavelet transform is invertible, it provides perfect reconstruction. Several variations of wavelet transformations, using the general principles described above, have been described in the articles cited.

Image data compression using discrete wavelet transforms begins by decomposing or transforming an image into four subbands or subimages using the above equations. Each subimage is one fourth the size of the original image, and contains one fourth as many data points as the original image. The image decomposition involves first performing a one-dimensional wavelet convolution on each horizontal pixel column of the original image, thereby dividing the image into two subimages containing low frequency and high frequency information respectively. The same or a similar convolution is then applied to each vertical pixel row of each subimage, dividing each of the previously obtained subimages into two further subimages which again correspond to low and high frequency image information. The resulting four subimages can be referred to as LL, LH, HL, and HH subimages. The LL subimage is the one containing low frequency information from both the vertical and horizontal wavelet convolutions. The LH subimage is the one containing low frequency image information from the horizontal wavelet convolution and high frequency image information from the vertical wavelet convolution. The HL subimage is the one containing high frequency information from the horizontal wavelet convolution and low frequency image information from the vertical wavelet convolution. The HH subimage is the one containing high frequency information from both the vertical and horizontal wavelet convolutions.

Figure 1:
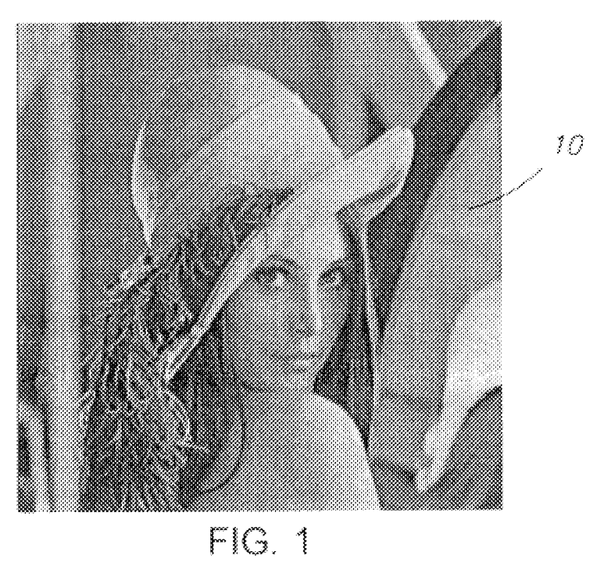
FIGS. 1–3 show a still image at various levels of decomposition in accordance with the methods of the invention.
Figure 2:
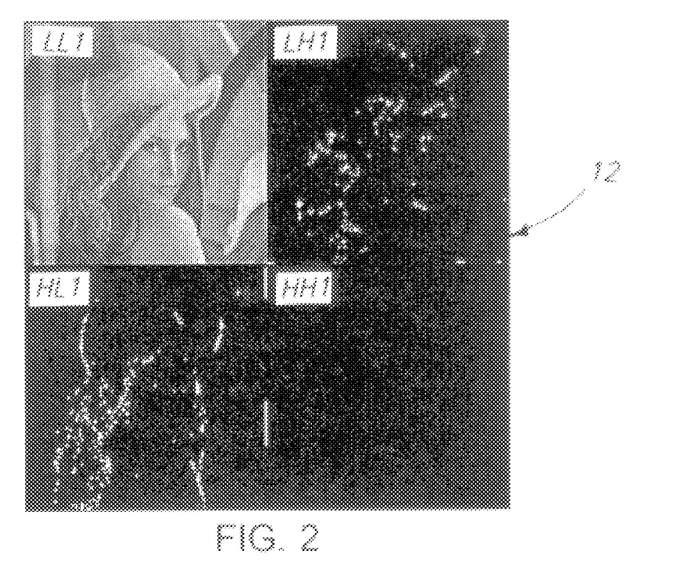

The result of this process is graphically illustrated in FIGS. 1 and 2. FIG. 1 shows an original, uncompressed still image 10. FIG. 2 shows a first decomposition level 12 of the same image. Decomposition level 12 is the result of transforming the still image of FIG. 1 using vertical and horizontal passes of a discrete wavelet transform as described above. Decomposition level 12 includes four subimages which are compositely grouped for purposes of illustration. The subbands or subimages of this first decomposition level are designated as the LL1, LH1, HL1, and HH1 subimages, in accordance with the nomenclature already given, with the suffix 1 indicating the first decomposition level. The LL1 subimage contains the low frequency information from the original image. Note that subimage LL1, when represented on a screen display, appears like the original image except at a lower resolution or size. The LH1 subimage contains high frequency information occurring in a vertical direction. The HL1 subimage contains high frequency information occurring in a horizontal direction. The HH1 subimage contains high frequency information occurring in a diagonal direction. In combination, the four subimages contain all the information necessary to reconstruct the original image.

Figure 3:
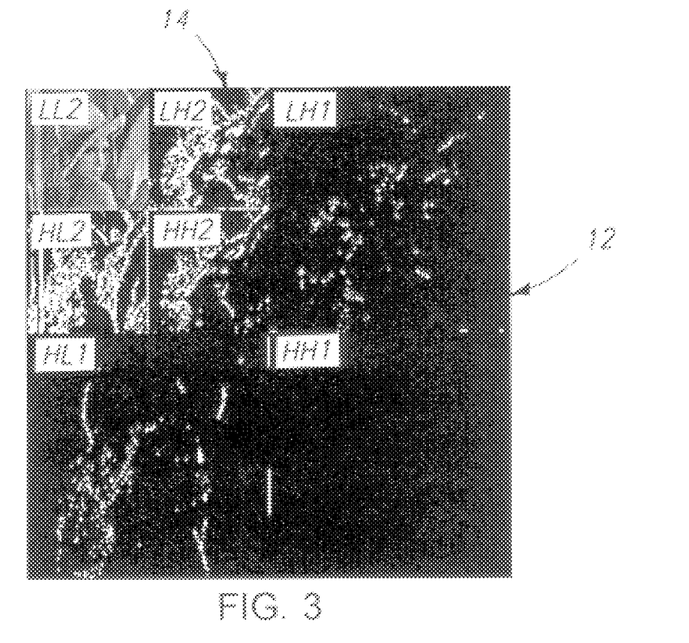

The first decomposition level can be further decomposed to include a second decomposition level 14 as shown in FIG. 3. This further decomposition is performed only on subimage LL1 of first decomposition level 12. To decompose subimage LL1, horizontal and vertical wavelet convolutions are performed on subimage LL1 in the same manner as the same operations have already been performed on the original image. This step subdivides subimage LL1 into LL2, LH2, HL2, and HH2 subimages. Again, subimage LL2 looks like the original image, except that it has a much lower resolution. Specifically, the LL subimage at each decomposition level has one fourth as many data points as the LL subimage of the next higher decomposition level.

The wavelet transforms described above are performed recursively on each successively obtained LL subimage. For the practical purposes to be accomplished by the invention described below, it has generally been found that calculating four or five decomposition levels is sufficient.

To reconstruct the original image, the inverse wavelet transform is performed recursively at each decomposition level. Assuming a two-level compression scheme, the second decomposition level contains a subimage LL2 which is a low resolution or base representation of the original still image. To obtain a higher resolution, subimage LL1 is reconstructed by performing an inverse wavelet transform using the subimages of the second decomposition level. The original image, at the highest available resolution, can subsequently be obtained by performing the inverse transform using the subimages of the first decomposition level (but only after obtaining subimage LL1 through an inverse transform of the second decomposition level).

The attractiveness of the wavelet approach to image transmission is that subimages LH, HL, and HH contain data which can be efficiently compressed to very high compression ratios through such methods as run-length and Huffman encoding. The preferred embodiments of the invention retain this advantage. In addition, the invention provides efficient methods of storing and transmitting still image data to allow the image to be quickly reconstructed and displayed, at ever-increasing resolutions, for early user evaluation. If the still image is found by the user to be unacceptable at any time during transmission, the transmission and reconstruction can be aborted before significant time is wasted.

SUMMARY OF THE INVENTION

The preferred embodiment of the invention includes a step of transforming a still image so that it can be conveniently previewed during transfer of the image over relatively low-speed data communication links such as telephone lines. The methods of the invention include transforming the image into a plurality of decomposition levels using a hierarchical subband encoding scheme such as the discrete wavelet transform. Each decomposition level comprises a plurality of subimages which allow reconstruction of an image representation of the still image. The decomposition levels are transmitted beginning with a base decomposition level or image representation, providing a low level of image resolution, and then proceeding with decomposition levels providing increasingly higher levels of image resolution. Each decomposition level can be inversely transformed to yield an image representation at a higher level of resolution. Within each decomposition level, rows of the various subimages are arranged or interlaced together in contiguous blocks, so that all data for a single row, at a single decomposition level, is transmitted together. At the receiving end of the transfer, the row blocks are reconstructed and displayed as they are received. The preferred embodiment of the invention enables the initial display of a low resolution image which is gradually updated and sharpened, on a row-by-row basis, until a desired high resolution is achieved. The user may terminate the transfer at any point if the image is not what is desired.

DETAILED DESCRIPTION OF THE PREFERRED EMBODIMENTS

The invention described below is useful for storing, transferring, receiving, and viewing still images. The invention is particularly useful in combination with transferring images over serial transmission media such as public voice-grade telephone lines or ISDN (integrated services digital network) communication channels. The preferred embodiment is described with reference to grey-scale or RGB still images. A grey-scale image comprises a single color plane having a matrix of pixel or intensity values corresponding to pixel intensities. An RGB image comprises three discrete color planes which each contain a matrix of pixel or intensity values corresponding to pixel intensities. An "R" color plane contains intensities for the red components of pixels. A "G" color plane contains intensities for the green components of pixels. A "B" color plane contains intensities for the blue components of pixels. Other still image representations could also be transferred using the methods of the invention.

Figure 4:
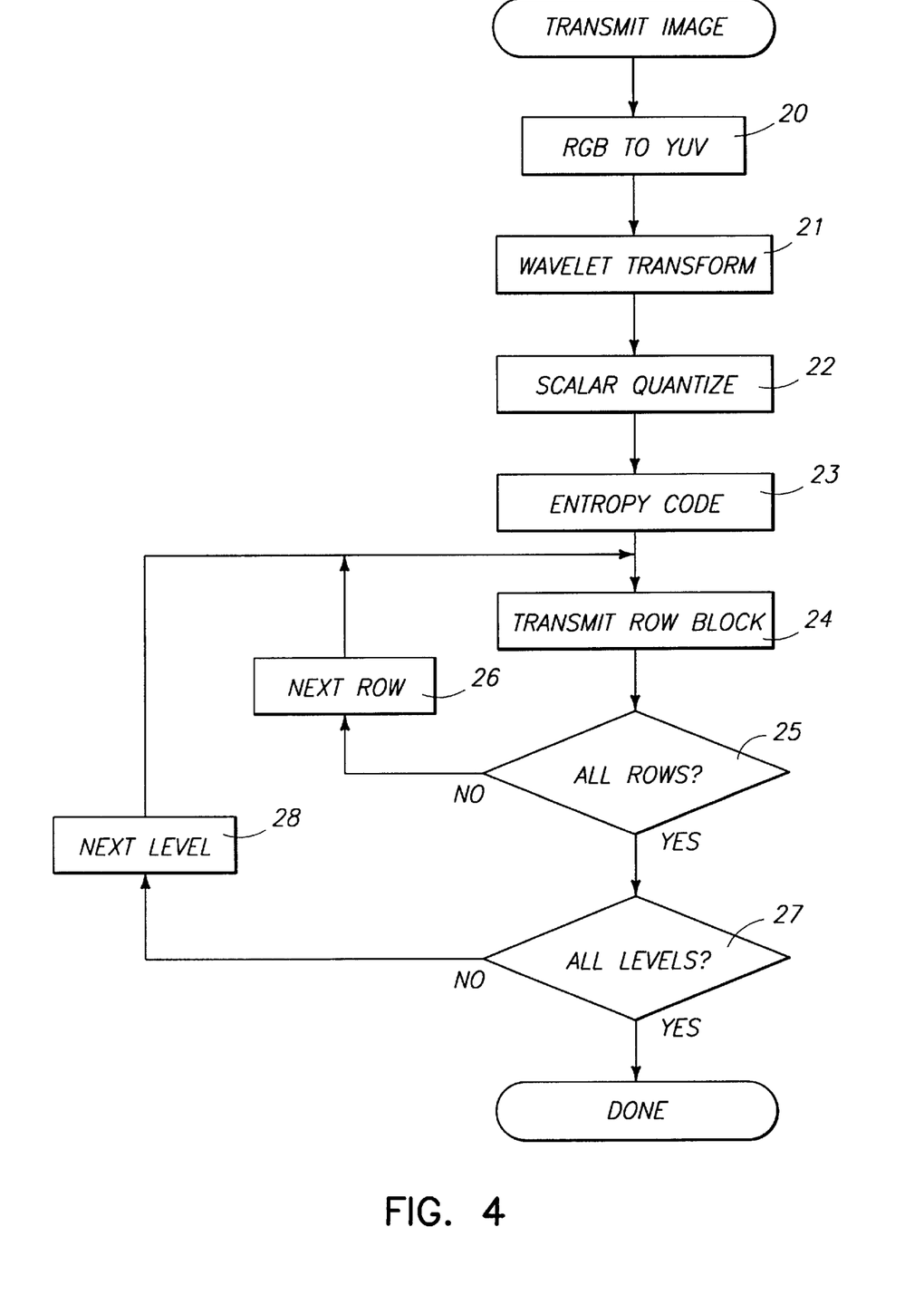
FIG. 4 is a flow diagram showing preferred steps of transmitting a still image in accordance with the invention.

The preferred steps of transferring an original image are shown in FIG. 4. A first step 20 comprises converting the color planes of the RGB image to luminance and chrominance (YUV) planes using well-known techniques. A subsequent step 21 comprises transforming the converted original image into a plurality of decomposition levels using a hierarchical subband encoding scheme such as the wavelet transformation process described in the Background of the Invention section. Each decomposition level comprises a plurality of subimages which allow reconstruction of an image representation of the original still image. Transforming step 21 includes calculating a separate set of subbands or subimages in each decomposition level for each luminance and chrominance plane. In other words, each YUV plane is transformed separately, and each decomposition level comprises a plurality or set of subimages for each YUV plane. Although the various steps are given with reference to a color YUV image, the methods work equally well with greyscale images which include only a single color, intensity, or luminance plane.

Step 21 preferably comprises creating at least three, and preferably four or more decomposition levels. Assuming four decomposition levels for purposes of explanation, the fourth decomposition level is considered a low resolution "base" decomposition level. It includes subimages YLL4, YLH4, YHL4, and YHH4 for the Y plane; ULL4, ULH4, UHL4, and UHH4 for the U plane, and VLL4, VLH4, VHL4, and VHH4 for the V plane.

The fourth decomposition level is nested within a third decomposition level having a relatively higher resolution. The third decomposition level contains, in addition to the fourth decomposition level, subimages YLH3, YHL3, YHH3, ULH3, UHL3, UHH3, VLH3, VHL3, and VHH3. Note that the base decomposition level is the only one which contains an explicitly specified LL subimage. The LL subimages of the higher resolution subimages are represented by the lower or nested decomposition levels, and must be calculated or inversely transformed from the lower or nested decomposition levels. The second decomposition level, at an even higher resolution than the third, contains the third decomposition level and subimages YLH2, YHL2, YHH2, ULH2, UHL2, UHH2, VLH2, VHL2, and VHH2. The first decomposition level contains the second decomposition level and subimages YLH1, YHL1, YHH1, ULH1, UHL1, UHH1, VLH1, VHL1, and VHH1.

Each subband or subimage contains rows of subimage values corresponding to rows of the image representation provided by the corresponding decomposition level. As already described, each subimage at a given decomposition level contains information regarding different frequency components of the original image or of the LL subimage of the next higher decomposition level. The various decomposition levels provide increasingly higher levels of image resolution.

Steps 22 and 23 of FIG. 4 comprise performing scalar quantization and entropy coding, respectively. The transformed image is scalar quantized on a level-by-level basis. The quantized values are also preferably compressed or encoded using Huffman and run-length encoding. Various forms of run-length encoding can be used for this purpose, as well as the other forms of data compression proposed in the cited literature.

The decomposition levels are successively transmitted, starting with the base decomposition level, which provides only a low resolution, and continuing with decomposition levels providing increasingly higher levels of image resolution. The decomposition levels are transmitted in accordance with steps 24 through 28 of FIG. 4. As indicated by step 24 the subimages are transmitted as contiguous row blocks. A particular row block contains all the subimage values necessary to allow reconstruction of a single row of an image representation at the resolution of a particular decomposition level. This reconstructed row forms one row of the LL subimage of the next higher decomposition level.

For a greyscale image, a row block comprises a single pixel row from each subimage of the selected decomposition level. For a color YUV image, the row block comprises a single pixel row from each subimage of each color plane of the selected decomposition level. For instance, a row block might comprise a pixel row from each of subimages YLH, YHL, YHH, ULH, UHL, UHH, VLH, VHL, and VHH of the selected decomposition level.

Step 24 is repeated for successive row blocks of a single decomposition level until all the rows of the subimages from the current decomposition level have been selected and transmitted. This is indicated by blocks 25 and 26 in FIG. 4. The process is then repeated for subsequent decomposition levels as indicated by blocks 27 and 28. This process continues until all row blocks of all decomposition levels have been transmitted.

As a specific example, transmission begins with a fourth or base decomposition level. Transmission of the base decomposition level begins with only its LL subimages to allow immediate display of a very rough image representation. For the color image being described herein, this includes subimages YLL4, ULL4, and VLL4. Transmission begins with a row block comprising the first row of YLL4, the first row of ULL4, and the first row of VLL4. Transmission continues with a subsequent row block comprising the second row of YLL4, then the second row of ULL4, and then the second row of VLL4. The remaining rows of subimages YLL4, ULL4, and VLL4 follow, arranged in further row blocks.

Transmission of the remaining subimages of the fourth decomposition level then continues, starting with a row block containing the first row of each of subimages YLH4, YHL4, YHH4, ULH4, UHL4, UHH4, VLH4, VHL4, and VHH4. The next row block contains the second row of each of subimages YLH4, YHL4, YHH4, ULH4, UHL4, UHH4, VLH4, VHL4, and VHH4. The remaining rows of subimages YLH4, YHL4, YHH4, ULH4, UHL4, UHH4, VLH4, VHL4, and VHH4 are similarly arranged and transmitted in sequential row blocks.

Transmission then continues with the third decomposition level, starting with a row block containing the first row of each of subimages YLH3, YHL3, YHH3, ULH3, UHL3, UHH3, VLH3, VHL3, and VHH3. Note that this decomposition level does not contain LL subimages, since the LL subimages of the decomposition level can be reconstructed from the already-transmitted fourth decomposition level. The next row block contains the second row of each of subimages YLH3, YHL3, YHH3, ULH3, UHL3, UHH3, VLH3, VHL3, and VHH3. The remaining rows of subimages YLH3, YHL3, YHH3, ULH3, UHL3, UHH3, VLH3, VHL3, and VHH3 are similarly arranged and transmitted in sequential row blocks.

The second and then the first decomposition levels are transmitted with the same ordering or interlacing of rows from the various subimages.

Thus, in accordance with methods of FIG. 4, an image is transmitted as a succession of decomposition levels allowing progressive reconstruction of the original image at ever-increasing levels of spacial resolution. Furthermore, information is transmitted on a line-by-line or row-by-row basis. Within a given decomposition level, all information for the first row, including the row information from all subimages and from all color planes, is transmitted as a single row block. This allows the image to be reconstructed line-by-line as it is received. A user is thus allowed the opportunity to abort transmission at any time, after viewing the image at a coarse resolution.

Figure 5:
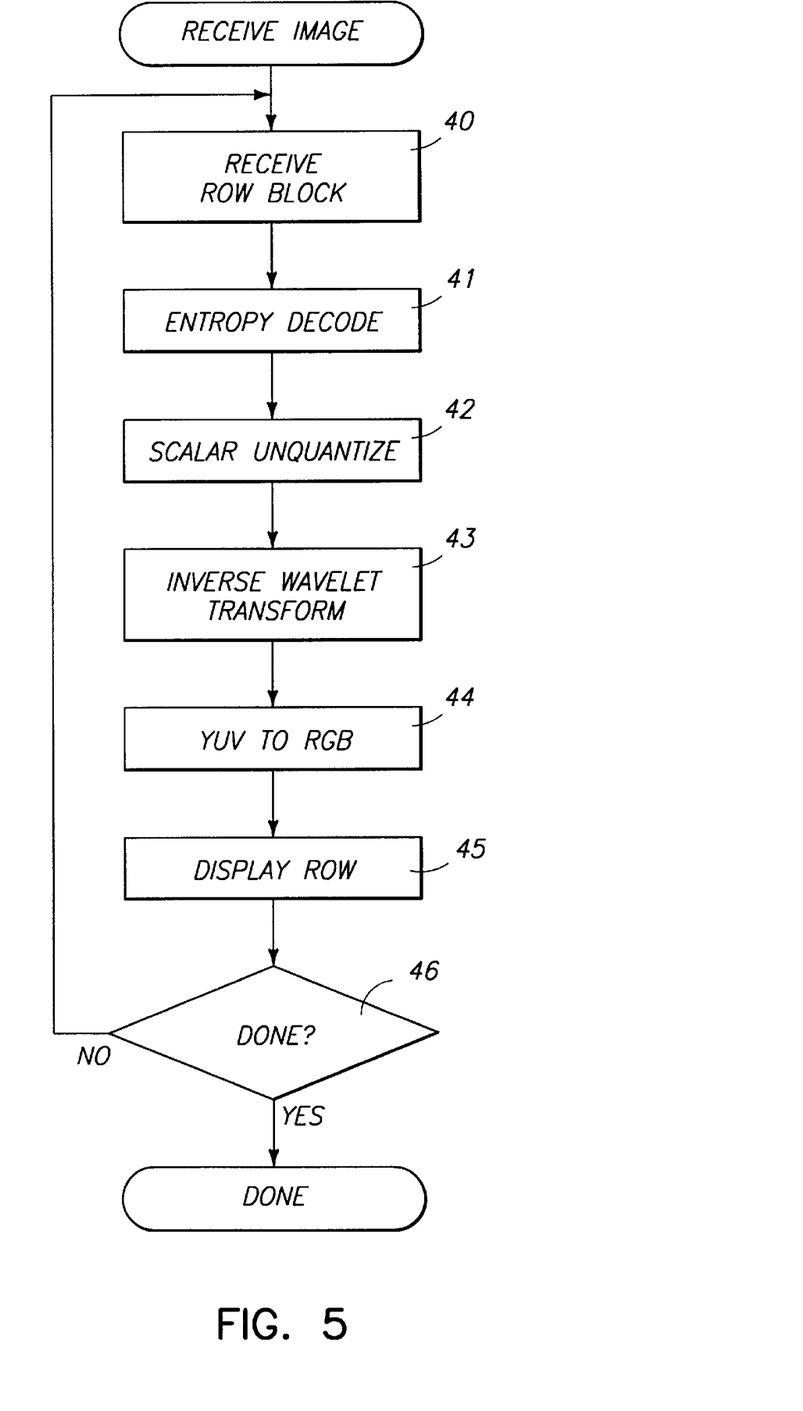
FIG. 5 is a flow diagram showing preferred steps of receiving and displaying a still image in accordance with the invention.

FIG. 5 illustrates the preferred steps of receiving and reconstructing an image. Block 40 indicates a step of receiving the row blocks discussed above. Steps 41 through 45 comprise reconstructing successive pixel rows corresponding to the still image at increasing levels of resolution by inversely transforming and displaying each row block. These steps are performed on each row block as it is received. Step 41 comprises entropy decoding; step 42 comprises scalar unquantization; step 43 comprises inverse wavelet transformation; and step 44 comprises YUV to RGB conversion. These steps are performed on each row of the current decomposition level and thereby reconstruct the corresponding row or rows of the next-higher decomposition level. This reconstruction creates a sequence of reconstructed images at increasing sizes corresponding to increasing resolution levels.

Step 45 comprises displaying each successive pixel row of each decomposition level as it is received and reconstructed. This allows a user to evaluate an image during its reception, without having to wait for the complete transfer of an image or even for the complete transfer of a decomposition level. Step 45 preferably includes a step of expanding each successive reconstructed image to a common size before actually displaying it. Such expansion is preferably accomplished with bilinear interpolation or pixel averaging in accordance with known techniques. Displaying step 45 might also include appropriate dithering if the image is to be displayed using a color palette which is smaller than that used to create the original image.

Figure 6:
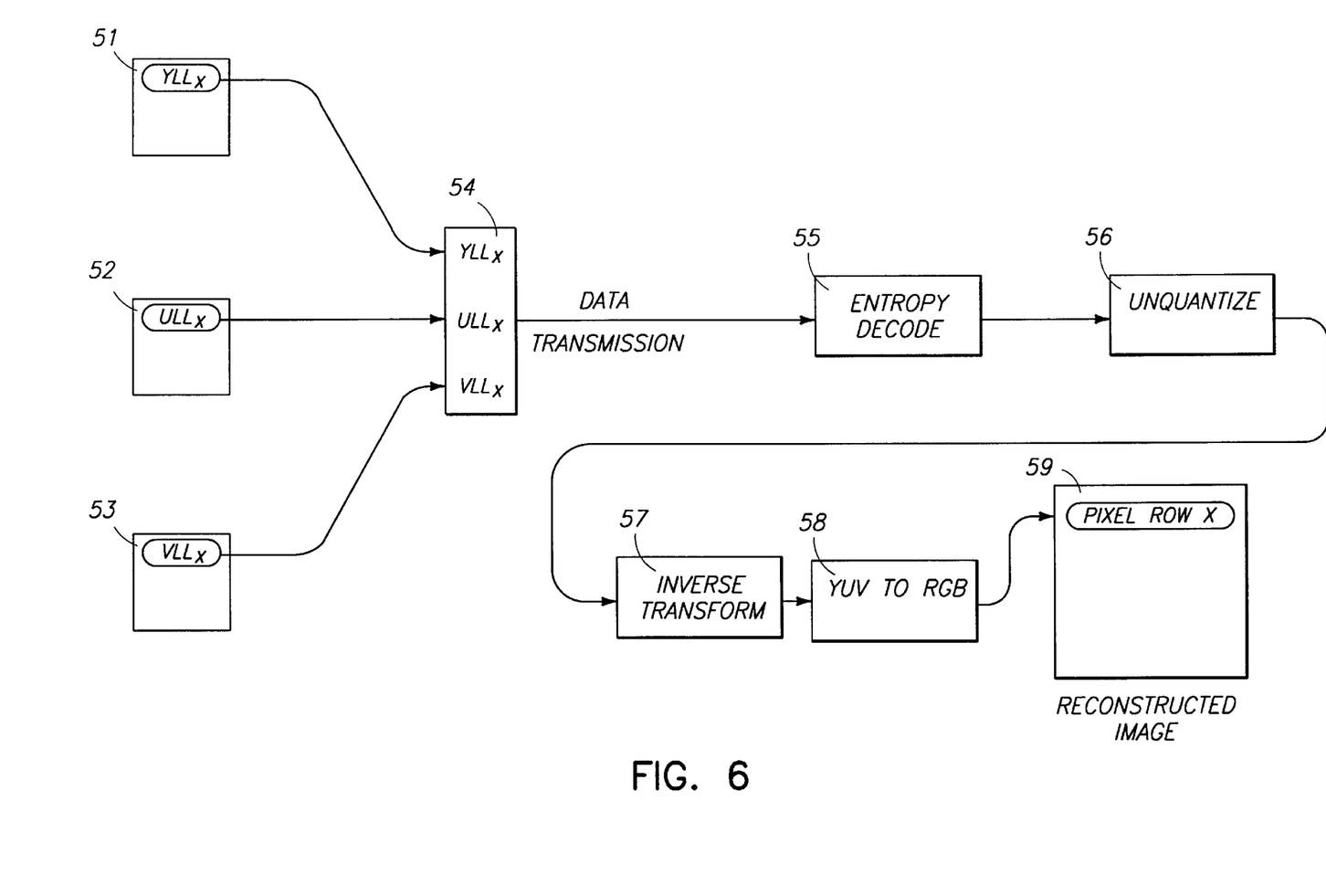
FIGS. 6 and 7 are figurative representations of the preferred steps of the invention.
Figure 7:
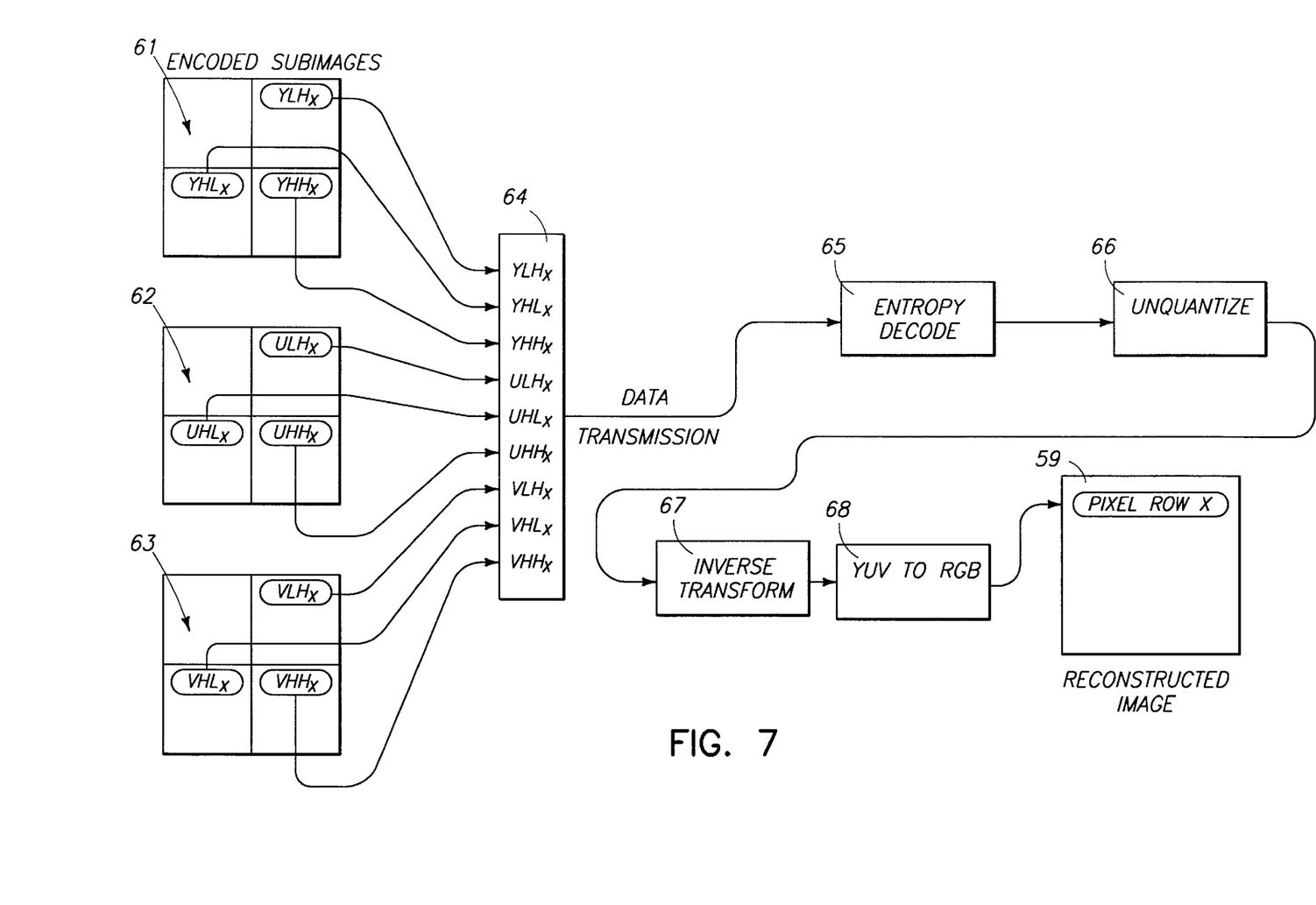

The transmission and reconstruction of single row blocks is figuratively shown in FIGS. 6 and 7. FIG. 6 shows Y, U, and V LL subimages 51, 52, and 53 of a base decomposition level, with a single pixel row x being selected from each LL subimage. The selected pixel rows are combined to form a row block 54. The single row block is transmitted as a block. After such transmission, entropy decoding, unquantizing, inverse transformation, and YUV to RGB conversion steps 55 through 58 are performed. This yields a single row x of a reconstructed image 59. Sequential rows of the LL subimages are blocked, transmitted, and reconstructed to yield all the pixel rows of image 59 at the base decomposition level.

FIG. 7 shows Y, U, and V subimages 61, 62, and 63 of a decomposition level which may or may not be a base decomposition level. Transmission in this case does not include LL subimages. Again, a single pixel row x is selected from each subimage. The selected pixel rows are combined to form a single contiguous row block 64 which is transmitted as a block. After such transmission, entropy decoding, unquantizing, inverse transformation, and YUV to RGB conversion steps 65 through 68 are performed. This yields a single row x of reconstructed image 59 at a higher resolution than previously available. Sequential rows of the subimages are blocked, transmitted, and reconstructed to yield all the pixel rows of image 59 at the resolution of the current decomposition level. This process is repeated at each decomposition level, so that image 59 is displayed at ever-increasing levels of resolution.

The specific arrangement and timing of the image transmission allows a user to view each portion of an image at the earliest possible moment. The image will be first drawn at a base or low level of resolution, corresponding to the LL subimages of the base decomposition level, starting at the top row and proceeding downward. During reception of the remaining subimages of the base decomposition level, the display will be updated, again row-by-row. The user will perceive a slight increase in sharpness, occurring gradually from top to bottom of the image. Further sharpness will be provided during reception of subsequent decomposition levels, until the image is fully reconstructed at its original resolution. Transmission can be aborted at any time by the user.

Figure 8:
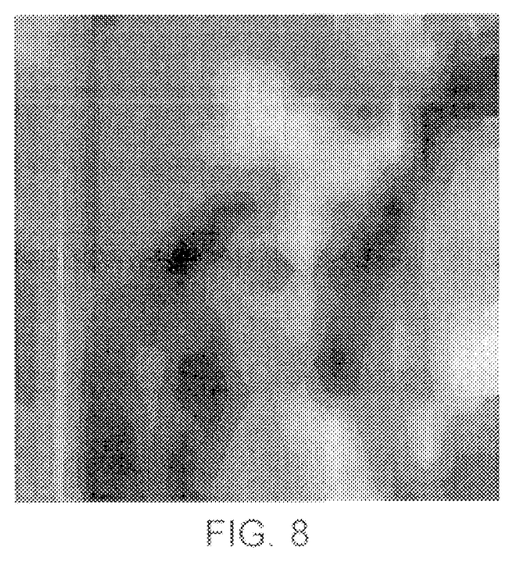
FIGS. 8–12 show an example of how the still image of FIG. 1 might appear as it is received and displayed at increasing levels of resolution.
Figure 9:
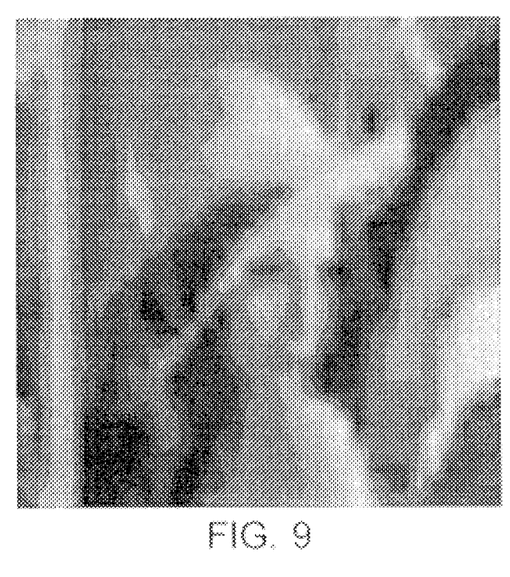
Figure 10:
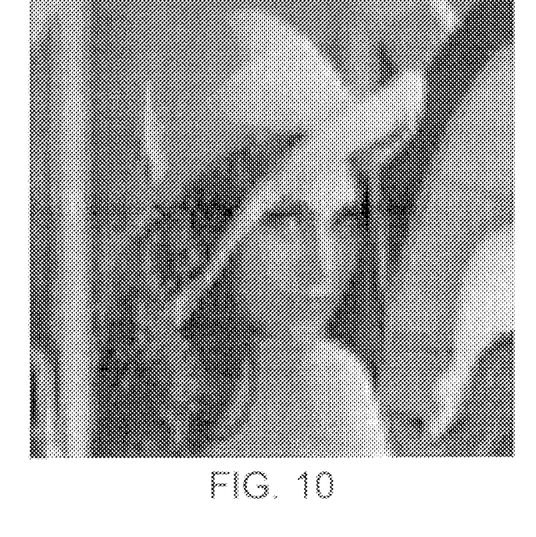
Figure 11:
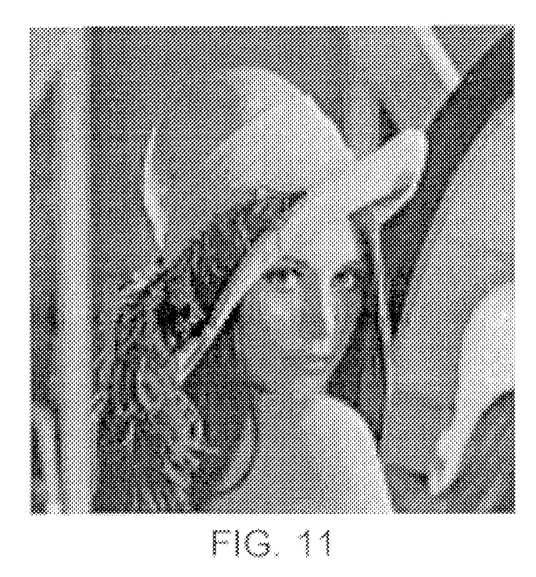
Figure 12:
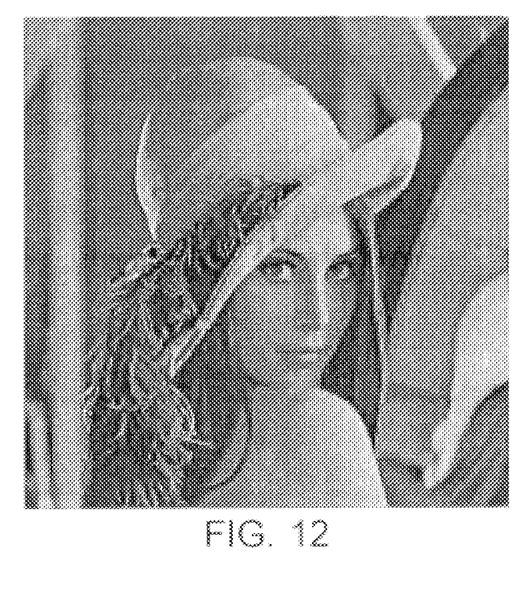

The result is illustrated by the sequence of displays shown in FIGS. 8 through 12. An initial image representation appears at a very low resolution as shown in FIG. 8. Note that this representation reflects the use of bilinear interpolation. This greatly enhances the recognizability of the image. The rough image of FIG. 8 is gradually updated, row by row, bottom to top, as row blocks of the next higher decomposition level are received and inversely transformed to achieve an image representation such as shown by FIG. 9. Reception and inverse transformation of further decomposition levels achieves the representations of FIGS. 10 and 11. Reception of the last decomposition level results in the high-resolution image of FIG. 12. The visual effect to a user is pleasing. Rather than seeing a succession of disjointed images, at increasing unrelated sizes, the user sees a single image of a fixed size, which gradually sharpens, row-by-row, to a very high resolution.

When the receiving computer is relatively slow, reconstructing steps 41 through 45 of FIG. 5 can be implemented to reconstruct and display only the luminance (Y) plane of the received YUV image. The luminance plane appears as a greyscale representation of an original color image and will in many cases be acceptable for previewing an image. Further reconstruction of the chrominance (UV) planes can be postponed until the user requests a full-color display of the original image.

It is advantageous to actually store still images in the decomposed, compressed, and ordered format described above. This minimizes storage space and also minimizes the recurring processing costs which would otherwise be necessary to transform and arrange the image data prior to or during each transfer. The invention thus includes a data file arranged as shown schematically in FIG. 13 for storing a still image. The data file is generally designated by the reference numeral 70. It comprises a plurality of decomposition levels representing the original still image at increasingly higher levels of resolution. The decomposition levels are arranged within the data file in order of increasing levels of resolution (shown from top to bottom in FIG. 13). For instance, the LL data from a fourth or base decomposition level is stored first in a data block 71, followed by the remaining LH, HL, and HH data of fourth decomposition level in a data block 72. This is followed by a third decomposition level in a data block 74, a second decomposition level in a data block 76, and a first decomposition level in a data block 78.

Figure 13:
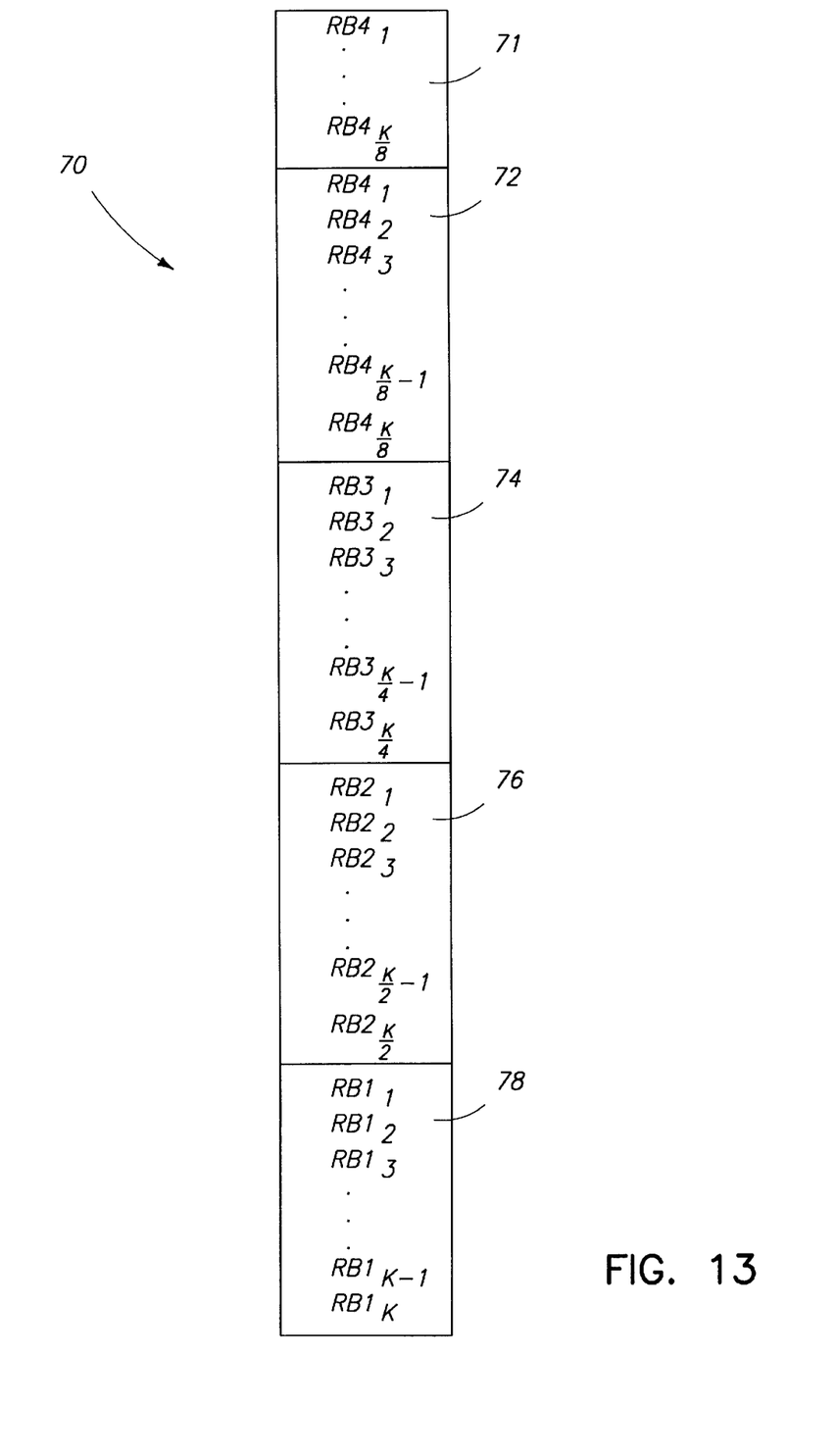
FIG. 13 shows a data file, in diagrammatic form, for storing a still image in accordance with a preferred embodiment of the invention.

As described above, each decomposition level comprises a plurality of subimages which allow reconstruction of an image representation corresponding to the original image. The subimages have rows of subimage values corresponding to rows of the image representation. The subimages are preferably transformed with a discrete wavelet transform.

Each decomposition level comprises a separate set of subimages for each luminance and chrominance plane of the still image. However, the rows of the various subimages are arranged within the data file and within each particular decomposition level to form row blocks as shown in FIG. 13. Each row block in FIG. 13 is indicated by the designation $RB\#_x$, where # indicates the decomposition level and the subscripted value indicates a particular row of the subimages of the decomposition level. As shown, the row blocks are arranged starting with a top row 1 of the subimages and ending with the bottom row of the subimages. The value K indicates the number of rows in the subimages of the first decomposition level.

The rows in each block correspond to a single common row of the image representation provided by the decomposition level containing the row block. Each row block contains all the data required to reconstruct said single row. Specifically, each row block contains a row of data from each or at least a plurality of the subimages of the decomposition level. For instance, a single row block contains $YLH\#_x$, $YHL\#_x$, $YHH\#_x$, $ULH\#_x$, $UHL\#_x$, $UHH\#_x$, $VLH\#_x$, $VHL\#_x$, and $VHH\#_x$, wherein x indicates a particular row of the subimages. The row blocks are preferably compressed using a form of run-length encoding and Huffman encoding.

The invention provides a needed improvement in the transfer of still images over relatively low speed communication links. The ability for a user to see enhancements to an initial, low-resolution image representation, so that the displayed image representation gradually sharpens to its full resolution on a line-by-line basis, is a particularly pleasing and desirable advantage when previewing images. The particular decomposition methods used provide additional advantages in that they are computationally efficient and allow for efficient data compression.

In compliance with the patent statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A method of transferring a still image which is represented by a plurality of decomposition levels, each decomposition level comprising a plurality of subimages which allow reconstruction of an image representation of the still image, said subimages having rows of subimage values corresponding to rows of said image representation, the decomposition levels providing increasingly higher levels of image resolution, the method comprising the following steps:

successively transmitting the decomposition levels, starting with a base decomposition level providing a low level of image resolution and continuing with decomposition levels providing increasingly higher levels of image resolution;

transmitting the subimage values of each particular decomposition level as row blocks, wherein each row block contains a row of subimage values from different subimages of the particular decomposition level, and wherein the subimage values of each row block correspond to a common image representation row.

2. A method as recited in claim 1 and further comprising:
receiving the row blocks of subimage values;
reconstructing successive pixel rows of the still image at increasing levels of resolution as each row block is received;
displaying each reconstructed pixel row of the still image as it is reconstructed.

3. A method as recited in claim 2 wherein the reconstructing step comprises creating a sequence of reconstructed images at increasing resolution levels.

4. A method as recited in claim 2 wherein:
the reconstructing step comprises creating a sequence of reconstructed images at increasing sizes corresponding to increasing resolution levels;
the method further comprises expanding the reconstructed images to a common size before displaying them.

5. A method as recited in claim 2 wherein:
the reconstructing step comprises creating a sequence of reconstructed images at increasing sizes corresponding to increasing resolution levels;
the method further comprises interpolating to expand the reconstructed images to a common size before displaying them.

6. A method as recited in claim 2 wherein the still image is represented by luminance and chrominance planes, and wherein the reconstructing and displaying steps reconstruct and display only the luminance plane.

7. A method of transferring a still image, the method comprising the following steps:

transforming the image into a plurality of decomposition levels, wherein each decomposition level comprises a plurality of subimages which allow it reconstruction of an image representation of the still image, said subimages having rows of subimage values corresponding to rows of said image representation, the decomposition levels providing increasingly higher levels of image resolution;

successively transmitting the decomposition levels, starting with a base is decomposition level providing a low level of image resolution and continuing with decomposition levels providing increasingly higher levels of image resolution;

transmitting the subimage values of each particular decomposition level as row blocks, wherein each row block contains a row of subimage values from different subimages of the particular decomposition level, and wherein the subimage values of each row block correspond to a common image representation row.

8. A method as recited in claim 7 wherein the transforming step comprises calculating the plurality of decomposition levels using a discrete wavelet transform.

9. A method as recited in claim 7 and further comprising encoding the row blocks before transmitting them.

10. A method as recited in claim 7 and further comprising run-length encoding the row blocks before transmitting them.

11. A method as recited in claim 7 wherein the still image comprises chrominance and luminance planes and wherein the transforming step comprises calculating a separate set of subimages in each decomposition level for each luminance and chrominance plane.

12. A method as recited in claim 7 wherein the still image comprises a plurality of color planes, the method further comprising converting the color planes to chrominance and luminance planes before the transforming step, wherein the transforming step comprises calculating a separate set of subimages in each decomposition level for each luminance and chrominance plane.

13. A method as recited in claim 7 and further comprising:

receiving the row blocks of subimage values;

reconstructing successive pixel rows of the still image at increasing levels of resolution by inversely transforming each row block as it is received;

displaying each reconstructed pixel row of the still image as it is reconstructed.

14. A method as recited in claim 13 wherein the reconstructing step comprises creating a sequence of reconstructed images at increasing resolution levels.

15. A method as recited in claim 13 wherein:

the reconstructing step comprises creating a sequence of reconstructed images at increasing sizes corresponding to increasing resolution levels;

the method further comprises expanding the reconstructed images to a common size before displaying them.

16. A method as recited in claim 13 wherein:

the reconstructing step comprises creating a sequence of reconstructed images at increasing sizes corresponding to increasing resolution levels;

the method further comprises interpolating to expand the reconstructed images to a common size before displaying them.

17. A method as recited in claim 13 wherein the still image is represented by luminance and chrominance planes, and wherein the reconstructing and displaying steps reconstruct and display only the luminance plane.

18. A method of transferring a still image, the method comprising the following steps:

transforming the image into a plurality of decomposition levels using a discrete wavelet transform, wherein each decomposition level comprises a plurality of subimages which allow reconstruction of an image representation of the still image, said subimages having rows of subimage values corresponding to rows of said image representation, the decomposition levels providing increasingly higher levels of image resolution;

successively transmitting the decomposition levels, starting with a base decomposition level providing a low level of image resolution and continuing with decomposition levels providing increasingly higher levels of image resolution;

transmitting the subimage values of each particular decomposition level as row blocks, wherein each row block contains a row of subimage values from different subimages of the particular decomposition level, and wherein the subimage values of each row block correspond to a common image representation row;

receiving the row blocks of subimage values;

reconstructing successive pixel rows of the still image at increasing levels of resolution by inversely transforming each row block as it is received;

displaying each reconstructed pixel row of the still image as it is reconstructed.

19. A method as recited in claim 18 and further comprising encoding the row blocks before transmitting them.

20. A method as recited in claim 18 and further comprising run-length encoding the row blocks before transmitting them.

21. A method as recited in claim 18 wherein the still image comprises chrominance and luminance planes and wherein the transforming step comprises calculating a separate set of subimages in each decomposition level for each luminance and chrominance plane.

22. A method as recited in claim 18 wherein the still image comprises a plurality of color planes, the method further comprising converting the color planes to chrominance and luminance planes before the transforming step, wherein the transforming step comprises calculating a separate set of subimages in each decomposition level for each luminance and chrominance plane.

* * * * *